United States Patent [19]

Chigrinsky et al.

[11] Patent Number: 5,178,542
[45] Date of Patent: Jan. 12, 1993

[54] LEARNING AID

[76] Inventors: Robert Chigrinsky, 1269 1st Ave.; Barry A. Richmond, 310 E. 70th St., both of New York, N.Y. 10021

[21] Appl. No.: 758,465

[22] Filed: Sep. 6, 1991

Related U.S. Application Data

[63] Continuation of Ser. No. 655,183, Feb. 13, 1991, abandoned, which is a continuation of Ser. No. 482,125, Feb. 20, 1990, abandoned.

[51] Int. Cl.⁵ .................. G09B 19/08; G09B 25/00
[52] U.S. Cl. .......................... 434/157; 434/368; 434/370
[58] Field of Search ............... 484/157, 158, 176, 165, 484/368–370

[56] References Cited

U.S. PATENT DOCUMENTS

| | | | |
|---|---|---|---|
| 2,294,465 | 9/1942 | Lasker | 434/368 |
| 2,314,790 | 3/1943 | Jenter | 434/368 |
| 2,360,328 | 10/1944 | Bell | 434/158 X |
| 2,455,353 | 12/1948 | Bell | 434/158 X |
| 2,882,619 | 4/1959 | Gloeckner | 434/368 |
| 2,883,767 | 4/1959 | Bell et al. | 434/158 |
| 3,055,118 | 9/1962 | Betancourt | 434/157 X |
| 4,371,345 | 2/1983 | Palmer et al. | 434/368 |
| 4,734,036 | 3/1988 | Kasha | 434/157 |

OTHER PUBLICATIONS

"Structure"; General Electric Co; 1941; pp. 1–12.
"Camera"; Sep. 1949; pp. 1–17.

*Primary Examiner*—Gene Mancene
*Assistant Examiner*—L. Thomas
*Attorney, Agent, or Firm*—Schweitzer Cornman & Gross

[57] ABSTRACT

A learning aid is disclosed which has particular benefit in the teaching and learning of a foreign language. To allow the reader to become accustomed to full phrase translation, as opposed to word-by-word translation, text and associated graphics are provided on a page. A transparent overlay contains a translation of the page text, positioned on the overlay on an opaque background in register with the wording translated. With the overlay lifted, the reader sees only the text in its original foreign-language version. After translating, the reader can lower the overlay to compare his or her efforts with the provided text.

7 Claims, 2 Drawing Sheets

LEARNING AID

This application is a continuation of abandoned Ser. No. 655,183, filed Feb. 13, 1991, which is a continuation of Ser. No. 482,125, filed Feb. 20, 1990, now abandoned.

BACKGROUND OF THE INVENTION

The present invention relates to an apparatus in the form of a book, booklet, magazine or similar construction having special utility as an aid to the improved learning, comprehension, ability to converse, and study of a foreign or unfamiliar language.

The learning of a foreign language is often a daunting prospect. One of the great difficulties associated with such a process is the difficulty in associating sentence structure and construction in a foreign language with the corresponding translation in the student's own tongue. In order to become comfortable in the reading and translation of a foreign language, it is helpful for the reader to have available a translation which can be easily referred to in a manner that would not overly disturb the thought process.

Traditionally, books and the like having readings adapted for learning are provided with translations of selected words in an alphabetical listing at the rear of the volume. This requires a turning of the pages and the effort to locate the specific word of interest in the often extensive listing. Further, not all words are listed, and the words that are included do not always have the precise form of the word of interest, thus requiring additional effort on behalf of the user to locate the related form and convert that form to the form of the word desired. Oftentimes this additional effort and time causes sufficient distraction from the basic text as to intrude upon the continuity of the reading.

It is further recognized that improved learning occurs by exposure to and appreciation of complete thoughts and speech patterns expressed in the flow of a language as it is often used. Thus, the traditional word-by-word translation should be supplemented or replaced by a more free-form translation, corresponding to the rendering of entire expressions or phrases, sometimes requiring a rejecton of a literal translation to provide a contextually correct and smooth translation. The traditional approach discussed above does not render itself easily adapted to such a methodology.

It is thus a purpose of the present invention to provide an apparatus which will make a translation of a reading more accessible to the user, and which will provide an increased recognition and appreciation of the sense of a foreign language as it is actually employed.

Yet a further purpose of the present invention is to provide such a translation, preferably in format which integrates both text and illustration, which will allow almost instantaneous conversion between languages.

Still another purpose of the present invention is to provide a mechanism by which translations between a plurality of languages may be presented with respect to a written text, each translation being presented in the form that passages in any of the presented languages can be compared in each of the languages represented.

The scope of the invention is such that it can be used in a variety of other formats where improved accessibility between two related sets of data are desired in a printed format.

BRIEF DESCRIPTION OF THE INVENTION

The above and other features are embodied in the present invention which comprises printed pages of conventional form bearing text in a first language, typically the language to be learned. Preferably, such text is placed on the page in conjunction with related artwork, such as provided in a conventional comic book format, wherein the artwork complements the writing and is intended to absorb the reader's interest and provide insight to and an understanding of the material of the text. Associated with each page is an overlay of a clear material. The overlay bears writing, typically a free translation in the reader's own language, located on the overlay in a position which masks the corresponding original text. Thus, with the overlay in position, the artwork may be seen solely in conjunction with the writing in the reader's native language. The reader, with the overlay raised, reads the page in the language to be learned. The reader can check his or her results quickly and without great interruption by lowering the overlay to see the corresponding text in his native language. The writing on the overlay completely covers and renders the language on the printed page unobservable. The reader is neither distracted nor prompted by the writing on the overlay unless and until it is desired to be seen. By the use of additional overlays in register with the first, it is additionally possible to present other languages, the reader being able to compare the passages in each language simply by turning the overlays as required.

BRIEF DESCRIPTION OF THE DRAWINGS

A fuller understanding of the present invention and other features and objects thereof, will be accomplished upon review of the following detailed description of preferred, but nonetheless illustrative embodiments of the invention when taken in association with the annexed Figures, wherein.

DESCRIPTION OF PREFERRED EMBODIMENTS

Figure 1:
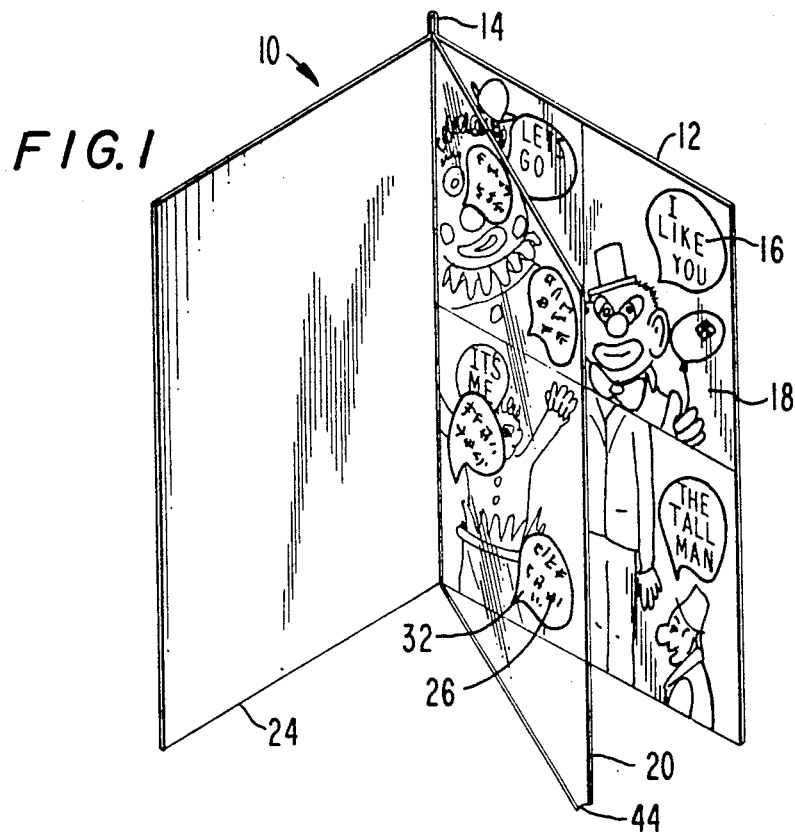
FIG. 1 is a perspective view of a first embodiment of the invention incorporated into a book form.
Figure 2:
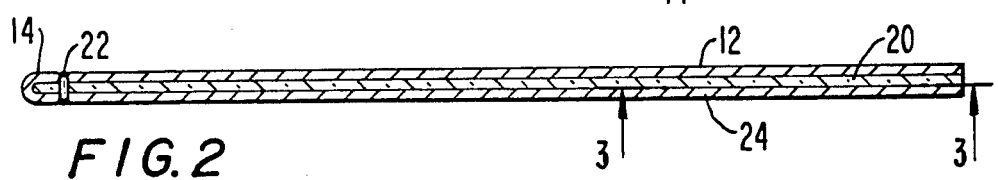
FIG. 2 is a top plan view of the invention showing the booklet of FIG. 1 in the closed configuration.
Figure 3:
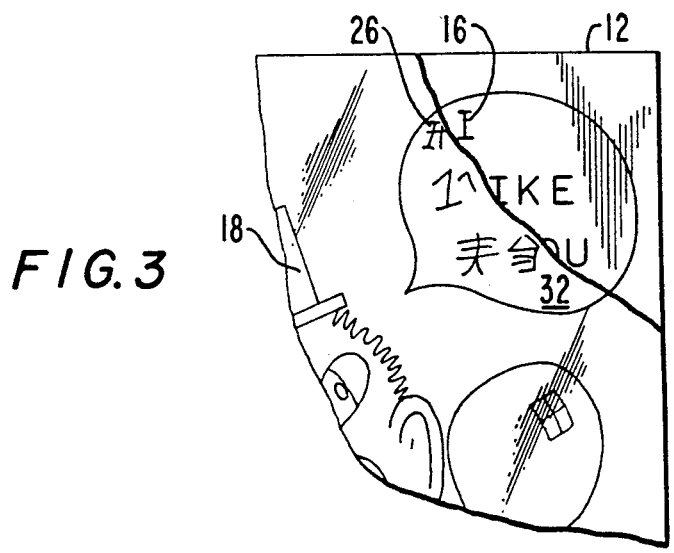
FIG. 3 is a partial elevation view in section along line 3—3 of FIG. 2.

Referring initially to FIGS. 1 through 3, a book 10 embodying the invention is formed of one or more pages 12, bound together along spine 14. As used herein, the term "book" refers to any multiple-page bound printing, such as a pamphlet, booklet, magazine and the like. Each page 12 incorporates text 16 and complementary artwork 18. As used herein, the term "artwork" contemplates, in addition to drawings and the like, other printed material of a non-textual nature of any form, such as photographs, graphic designs, and the like, placed on the page for consideration in conjunction with the text 16. As shown in the Figures, an especially preferred embodiment of the invention is the "comic book" format, in which at least portions of the text may be included within "dialogue balloons" associated with characters depicted in the artwork. Other formats for the included text may be employed, such as captions, copy blocks, notes and the like.

Also bound to the spine 14 is transparent overlay sheet 20, preferably formed of a thin, perfectly clear sheet of an appropriate material, such as plastic or triacetate. As shown, overlay 20 is of the same size in plan as the page 12 with which it is to be associated. The pages 12 and overlays 20 are bound together at spine 14 by stitching or staples 22 or in such other equivalent manner, such as gluing, as known in the art. The resulting construction will usually include a cover 24 of conventional character, which itself can be overlaid by a transparent overlay sheet with the appropriate textual matter printed thereon. There is, of course, an overlay sheet 20 for each sheet side bearing copy. Thus, the page 12 may have a pair of overlays, one on each side, if copy appears on both sides of the page.

Positioned on overlay 20 is textual material 26, positioned on the overlay to be aligned with and to cover the corresponding textual material 16 on the page 12. As shown in the Figures, the text on the pages 12 may, for example, be in a first language, with the corresponding text on the overlay 20 being of a second language. A preferred format includes presentation of the language to be learned as the first language on the pages 12, with the reader's primary language as the second language on the overlay. While the two sets of writing are related to each other as "translations", it is to be recognized that such a term is intended to encompass any of a variety of relationships, including vernacular or colloquial translation, commentary or the like.

It is intended that the artwork on the page 12 be visible through the overlay, its integrity being, preserved while the textual material 16 on the page is blocked and overlaid with the alternative text 26 on the overlay. A preferred form for the overlay text is with the use of an opaque area, normally equal in size and shape to the associated "balloon" on the underlying page, forming a second balloon 32 on the overlay on which the text 26 is placed. This insures complete blocking of the underlying text. It is, of course, recognized that, while the embodiment presented in FIGS. 1 through 3 shows a single page and overlay, multiple pages and overlays may be combined together to provide a multiple page assembly. It is also contemplated that the overlays may be provided with means, such as a tab cut 44, to facilitate separation from the underlying page.

Figure 4:
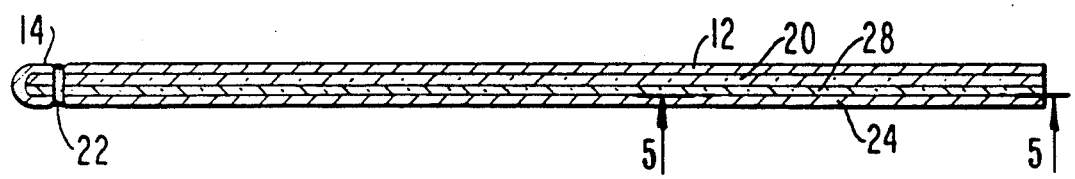
FIG. 4 is a top plan view of a second embodiment of the invention detailing a construction in which multiple overlays are utilized.
Figure 5:
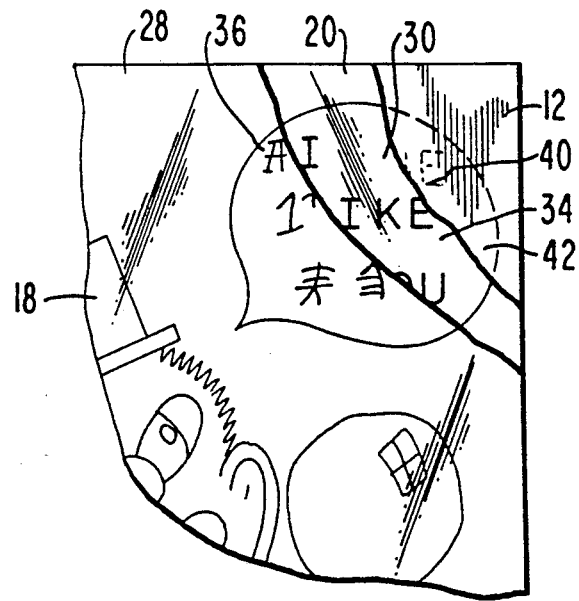
FIG. 5 is a partial elevation view in section along line 5—5 of FIG. 4

A second embodiment of the present invention is presented in FIGS. 4 and 5. As shown therein, the page 12 is again provided with artwork 18, but in this instance does not include the textual material. Rather, the page 12 is provided with a first overlay 20 and a second overlay 28, both in register with the page and bound to the spine 14 by the stiching or similar means 22. In this embodiment, first overlay 20 bears the first form of text 30, such as text in the language to be learned, in opaque balloon 34, while second overlay 28 bears a second form of text 36, such as text in the reader's primary language in opaque balloon 38, in register with and overlying corresponding balloon 34.

Alternatively, and as shown in phantom in FIG. 5, the page 12 may bear yet a third version of the text at 40, in register with the associated text on the overlays 20 and 28, or may include a blank and opaque balloon 42, in which the reader can write his or her own translation or notes. In this aspect, the overlay 28 can bear text in a language to be translated, while overlay 20 bears the text in the language to which translation is to be made. With both overlays in register, the reader sees only the text to be translated. By raising both overlays together, access is afforded to the page 12, and the proposed translation can be written in the corresponding blank balloon area. Assistance can be provided, if desired, by the reader separating the overlays to view the supplied translation on the first overlay 20. Still further, one of the overlays, rather than the page, can include blank and opaque balloons in register with the printed page balloon, which would then include text.

We claim:

1. A device for assisting in improving comprehension and learning, comprising at least one page comprising an illustration section and an associated, non-overlapping text section; an overlay comprising both an illustration section-overlying portion and a text section-overlying portion bound to an edge of said page, said overlay being turnable from a page overlying position to a non-overlying position, the entirety of said illustration section-overlying portion being transparent whereby the entirety of said illustration section is visible through said overlay, said overlay being opaque in the text section-overlying portion, said text section-overlying portion further bearing text thereon positioned to overlie the text overlaid on said page when said overlay is overlaid upon said page, said text on said text section-overlying portion being also associated with the illustration on said page.

2. The device of claim 1, wherein said text on said overlay is of a second language to the text of said page, said overlay text being a translation of the overlaid page text.

3. The device of claim 2, wherein said overlay includes a tab cut to facilitate separation of the overlay from said page.

4. The device of claim 1, further comprising a second transparent overlay comprising both an illustration section-overlying portion and a text section-overlying portion bound to an edge of said page turnable from a page-overlying position to a non-overlying position, said overlay and said second overlay being individually positionable overlaying and upon said page, said text section-overlying portion of said second overlay being opaque.

5. The device of claim 2, further comprising a second transparent overlay comprising both an illustration section-overlying portion and a text section-overlying portion bound to an edge of said page turnable from a page-overlying position to a non-overlying position, said overlay and said second overlay being individually positionable overlying and upon said page, said text section-overlying portion of said second overlay being opaque.

6. The device of claim 1 further comprising a second overlay comprising both an illustration section-overlying portion and a text section-overlying portion bound to an edge of said page turnable from a page-overlying position to a non-overlying position, said illustration section-overlying portion of said second overlay being transparent and said text section-overlying portion of said second overlay being opaque, said opaque portion further bearing text different from the text on said first overlay overlying the text on said page when said second overlay overlies said page.

7. The device of claim 1 wherein said illustration section and text section on said page are presented in cartoon format.

* * * * *